(12) United States Patent
Dispenza et al.

(10) Patent No.: US 9,586,187 B2
(45) Date of Patent: Mar. 7, 2017

(54) MIXING SEGMENTS FOR AN EXTRUSION APPARATUS AND METHODS OF MANUFACTURING A HONEYCOMB STRUCTURE

(71) Applicant: CORNING INCORPORATED, Corning, NY (US)

(72) Inventors: Matthew Joseph Dispenza, Horseheads, NY (US); Christopher John Malarkey, Corning, NY (US); Kenneth Charles Sariego, Beaver Dams, NY (US); Chauncey James Watches, Painted Post, NY (US)

(73) Assignee: CORNING INCORPORATED, Corning, NY (US)

(\*) Notice: Subject to any disclaimer, the term of this patent is extended or adjusted under 35 U.S.C. 154(b) by 762 days.

(21) Appl. No.: 13/861,880

(22) Filed: Apr. 12, 2013

(65) Prior Publication Data

US 2014/0306370 A1 Oct. 16, 2014

(51) Int. Cl.
| | | |
|---|---|---|
| *B01F 7/00* | (2006.01) | |
| *B29C 47/52* | (2006.01) | |
| *C04B 35/622* | (2006.01) | |
| *B28B 3/22* | (2006.01) | |
| *B29C 47/00* | (2006.01) | |
| *B29C 47/40* | (2006.01) | |
| *B29C 47/64* | (2006.01) | |

(52) U.S. Cl.
CPC ...... *B01F 7/00016* (2013.01); *B01F 7/00883* (2013.01); *B28B 3/222* (2013.01); *B28B 3/224* (2013.01); *B29C 47/0004* (2013.01); *B29C 47/0028* (2013.01); *B29C 47/408* (2013.01); *B29C 47/64* (2013.01); *C04B 35/622* (2013.01); *Y10T 29/49764* (2015.01)

(58) Field of Classification Search
CPC .............. B29C 47/605; B29C 47/6043; B29C 47/6075; B29C 47/64; B01F 7/00883; B01F 7/00016
USPC ....................................... 366/82, 85, 322, 81
See application file for complete search history.

(56) References Cited

U.S. PATENT DOCUMENTS

| | | | | |
|---|---|---|---|---|
| 3,006,029 | A | * 10/1961 | Saxton | .................... B29C 47/60 366/90 |
| 3,719,351 | A | 3/1973 | Upmeier | ....................... 259/191 |
| 6,048,088 | A | * 4/2000 | Haring | ................ B29C 47/0825 366/85 |
| 6,136,246 | A | 10/2000 | Rauwendaal et al. | ... 264/211.21 |
| 2007/0263479 | A1 | 11/2007 | Hennes | .......................... 366/82 |
| 2010/0052206 | A1 | 3/2010 | Kerr et al. | ................ 264/211.11 |

(Continued)

FOREIGN PATENT DOCUMENTS

JP WO 2012137666 A1 * 10/2012 ............. B29B 7/483

*Primary Examiner* — Charles Cooley
*Assistant Examiner* — Marc C Howell
(74) *Attorney, Agent, or Firm* — Joseph M. Homa (57) ABSTRACT

A mixing segment for an extrusion apparatus comprises a shaft and a plurality of plow elements aligned along a helical path extending about a rotation axis of the shaft. Each plow element includes an outer peripheral arcuate ramp extending radially outwardly along the helical path from a root to an outer tip of the plow element. Methods of manufacturing a mixing segment and methods of manufacturing a honeycomb structure with an extrusion apparatus are also provided.

17 Claims, 9 Drawing Sheets

(56) References Cited

U.S. PATENT DOCUMENTS

2012/0146292 A1\* 6/2012 Ikeda .................. B29C 47/0871
     277/586

\* cited by examiner

MIXING SEGMENTS FOR AN EXTRUSION APPARATUS AND METHODS OF MANUFACTURING A HONEYCOMB STRUCTURE

TECHNICAL FIELD

The present disclosure relates generally to mixing segments for an extrusion apparatus and methods of manufacturing a honeycomb structure with an extrusion apparatus.

BACKGROUND

Known apparatus and methods for providing a batch material that involves the preparatory mixing and other processing of the material can impart to the batch material one or more of temperature gradients, shear gradients and compositional constituent gradients that adversely affect the properties of products manufactured from the batch material. For example, ceramic material that is conditioned, mixed and pumped in a twin screw extruder to provide an forming material suitable to be extruded through a die can possess properties that reflect temperature, shear and compositional constituent gradients imposed on the ceramic material during its conditioning, mixing and pumping. These properties can adversely affect the quality of the products, such as a honeycomb articles or other thin-walled articles produced from the ceramic materials for example. Polymers comprise other examples of batch materials with respect to which it can be desirable to avoid the imposition of temperature gradients, shear gradients and compositional constituent gradients during their processing.

SUMMARY

The following sets forth a simplified summary of aspects, embodiments and examples of the present disclosure and does not constitute an extensive overview of all aspects, embodiments or examples of the disclosure. Neither is the summary intended to identify critical features or delineate the scope of the disclosure. The sole purpose of the summary is to present selected aspects, embodiments and examples in a brief form as an introduction to the more detailed description of the aspects, embodiments and examples that follow the summary.

In a first aspect, a mixing segment for an extrusion apparatus comprises a shaft and a plurality of plow elements aligned along a helical path extending about a rotation axis of the shaft. Each plow element includes an outer peripheral arcuate ramp extending radially outwardly along the helical path from a root to an outer tip of the plow element.

In one example of the first aspect, each plow element further includes a step extending radially inward from the outer tip of the plow element toward the shaft. In one example, the step includes a portion extending underneath the respective outer tip of the plow element. In another example, each step is positioned between a corresponding pair of the arcuate ramps of the plow elements.

In a further example of the first aspect, the plurality of plow elements are substantially identical to one another.

In yet another example of the first aspect, the plow elements are substantially equally radially spaced with respect to one another about the rotation axis of the shaft.

In a further example of the first aspect, each ramp comprises an unenclosed conveying surface.

In yet another example of the first aspect, the arcuate ramp includes convex helical profile along the helical path.

In another example of the first aspect, the arcuate ramp includes a substantially straight profile along a direction transverse to the helical path.

In still another example of the first aspect, the arcuate ramp includes a substantially concave profile along a direction transverse to the helical path.

In a further example of the first aspect, the arcuate ramp includes a substantially V-shaped profile along a direction transverse to the helical path.

In yet another example of the first aspect, the arcuate ramp includes a groove extending along the helical path.

The first aspect can be provided alone or in combination with any one or any combination of the examples of the first aspect discussed above.

In a second aspect, an extrusion apparatus is provided with a mixing segment. In one example, the mixing segment may be provided in accordance with the first aspect above alone or in combination with any one or any combination of examples of the first aspect discussed above. The extrusion apparatus comprises a housing defining an interior area, wherein the mixing segment extends within the interior area.

In one example of the second aspect, the mixing segment includes a first mixing segment and a second mixing segment extending within the interior area, wherein the rotation axis of the shafts of the mixing segments are spaced apart from one another. In one example, the rotation axis of the first mixing segment is substantially parallel with respect to the rotation axis of the second mixing segment.

In a third aspect, a method of manufacturing a mixing segment is provided. In one example, the method can manufacture the mixing segment in accordance with the first aspect above alone or in combination with any one or any combination of examples of the first aspect discussed above. The method includes the step of positioning the helical path at an angle α with respect to the rotation axis of the shaft determined from the following formula:

$$\alpha = \sin^{-1}\frac{V_2}{\sqrt[2]{(V_1)^2 + (V_2)^2}}$$

wherein, $V_1$ is an expected velocity at which the forming material advances past the mixing segment; and $V_2$ is an expected arithmetic average of an expected tangential velocity of the root of the plow element with $V_1$ and $V_2$ having velocity vectors that are right angles with respect to one another.

In fourth aspect, a method of manufacturing a mixing segment is provided. In one example, the method can manufacture the mixing segment in accordance with the first aspect above alone or combination with any one or any combination of examples of the first aspect discussed above. The method includes the step of determining a velocity vector for a desired velocity of the passage of the forming material through the extrusion apparatus. The method further includes the step of determining a velocity vector for the tangential velocity at the root of the plow element for a desired rotational speed of the mixing segment. The method further includes the step of determining a velocity vector for the tangential velocity at the outer tip of the plow element for the desired rotational speed of the mixing segment. The method still further includes the step of calculating the arithmetic average of the velocity vector for the tangential velocity at the root of the plow element and the velocity vector for the tangential velocity at the outer tip of the plow element. The method still further includes the step of calculating a resultant velocity vector based on the velocity vector for a desired velocity of the passage of the forming material through the extrusion apparatus and the arithmetic average of the velocity vector. The method also includes the step of manufacturing the mixing segment such that the helical path is positioned at an angle with respect to the rotation axis of the shaft based on the calculated resultant velocity vector.

In a fifth aspect, a method is provided for manufacturing a honeycomb structure with an extrusion apparatus including a housing defining an interior area and a mixing segment extending within the interior area, wherein the mixing segment includes a shaft and a plurality of plow elements aligned along a helical path extending about a rotation axis of the shaft, wherein each plow element includes an outer peripheral arcuate ramp extending radially outwardly along the helical path from a root to an outer tip of the plow element. The method includes the step (I) of introducing a quantity of ceramic or ceramic forming material into the interior area of the housing. The method further includes the step (II) of rotating the mixing segment about the rotation axis of the shaft such that first portions of the quantity of forming material are urged in an extrusion direction by lateral sides of the plow elements and second portions of the quantity of the forming material each travel along at least a respective portion of the outer peripheral arcuate ramp and plowed over the outer tip of the respective plow element. The method further includes the step (III) of extruding the forming material through an extrusion die to form the honeycomb structure.

In one example of the fifth aspect, step (II) includes plowing the second portions of the quantity of forming material over the outer tip of the respective plow element into a corresponding step positioned between the respective plow element and an adjacent plow element along the helical path of the mixing segment. For example, step (II) of the method can include plowing part of the second portion of the quantity of forming material into a portion of the corresponding step extending underneath the outer tip of the respective plow element.

BRIEF DESCRIPTION OF THE DRAWINGS

The foregoing and other aspects, embodiments and examples can be better understood when the detailed description set forth below is read with reference to the accompanying drawings in which.

DETAILED DESCRIPTION

Aspects, embodiments and examples will now be described more fully with reference to the accompanying drawings in which certain aspects, embodiments and examples are shown. Whenever appropriate, the same reference numerals are used throughout the drawings to refer to the same or like parts. It should be understood that aspects, embodiments and examples may be represented in many different forms and should not be construed as limited to the specific aspects, embodiments and examples set forth herein.

According to one aspect, an extrusion apparatus can include a mixing segment in accordance with aspects of the disclosure. Mixing segments can be used in a wide range of extrusion apparatus configurations such as single screw, twin-screw configurations. The mixing segments of the present disclosure can be useful to produce, for example, extrusion products such as ceramic honeycomb articles (e.g., porous ceramic honeycomb articles). Porous ceramic honeycomb articles produced by methods with the mixing segments discussed below can be useful to filter out undesirable components such as particulate matter from an exhaust stream from a diesel engine for example. In further examples, the ceramic honeycomb articles, such as porous ceramic honeycomb articles, can be used as substrates that carry a catalyst to process gases from an exhaust stream of an engine.

Ceramic honeycomb articles can be produced from various materials depending on a variety of factors, including the particular use to which the articles are applied and the characteristics of the materials. For instance, the ceramic honeycomb articles can be produced from cordierite, aluminum titanate, silicon carbide, mullite or other ceramic and/or ceramic-forming materials.

Figure 1:
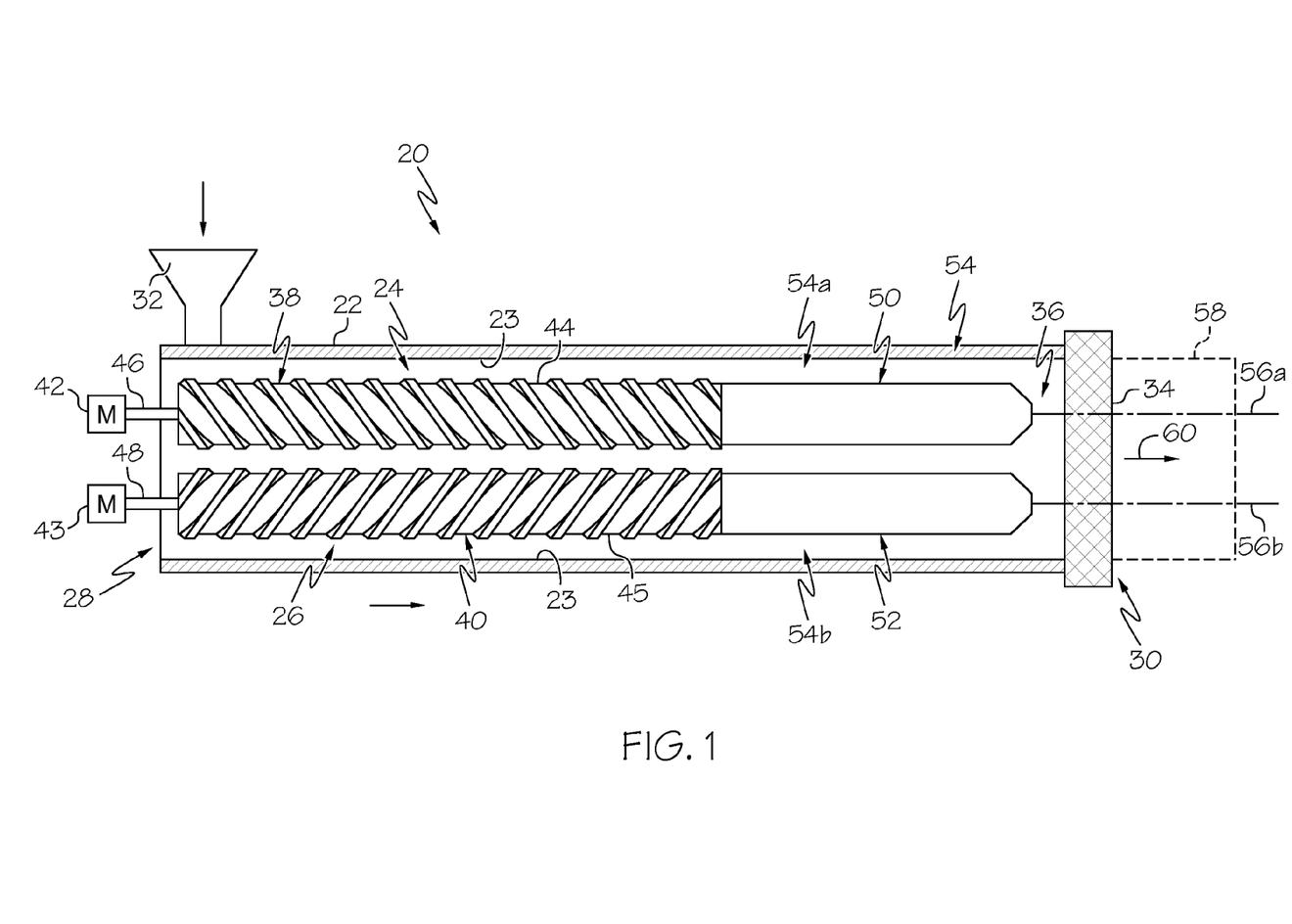
FIG. 1 is a schematic view of an example extrusion apparatus including a mixing segment.

A variety of ceramic honeycomb articles can be produced based on the concepts of the present disclosure. For instance, FIG. 1 illustrates a schematic example of one extrusion apparatus 20 that may incorporate one or more mixing segments in accordance with aspects of the disclosure. While the extrusion apparatus 20 is shown to include a twin-screw extruder configuration, a single screw extruder or other extruder configurations may be used in further examples. In some examples a single mixing segment may be provided that may be attached or integral with the overall extrusion screw construction although a plurality of mixing segments in series with one another and/or in parallel with one another may be provided in further examples. For instance, although a single mixing segment may be provided, a plurality of mixing segments may be arranged in series with one another to be coaxially aligned with one another and attached or integral with the overall extrusion screw construction of a first extrusion screw. In addition or alternatively, another single or plurality of mixing segments may be arranged in series with one another to be coaxially aligned with one another and attached or integral with the overall extrusion screw construction of a second extrusion screw. If provided, the second extrusion screw may be substantially parallel with the first extrusion screw.

As shown, the example extrusion apparatus 20 can include a housing 22 that includes a pair of chambers 24 and 26 contained within the housing and in communication with each other. The housing 22 can be monolithic, or the housing can be formed from a plurality of housing segments connected in series along the longitudinal extent of the housing. The chambers 24 and 26 extend along the longitudinal extent of the housing 22 from an upstream end 28 of the housing to a downstream end 30 of the housing. At the upstream end 28 of the housing 22, a material supply port 32, which can comprise a hopper or other material supply structure, is provided for supplying to forming material to the extrusion apparatus 20. An extrusion die 34 is provided at a discharge port 36 located at the downstream end 30 of the housing 22 for extruding the forming material into a desired shape, such as honeycomb green body of ceramic and/or ceramic forming material for example. The extrusion die 34 can be coupled directly to the discharge port 36 of the housing 22 or another structure, such as a generally open cavity (not shown), screen/homogenizer (not shown) or the like.

The extrusion apparatus 20 can include various additional features. For example, the extrusion apparatus can include a second supply port (not shown) at a location intermediate the upstream end 28 and downstream end 30 of the housing 22 for supplying additional forming material, additives, etc. to be processed at the extrusion apparatus 20. In another example, the housing 22 can include open vents (not shown) in communication with the chambers 24 and 26 for degassing the chambers, and/or a vacuum vent (not shown) can be provided for placing the chambers 24 and 26 under vacuum. In addition, heat transfer equipment (not shown) can be associated with the exterior of the housing 22 for cooling the housing and, thereby, the forming material being processed within the extrusion apparatus 20, particularly as the forming material comes into contact with an inside surface 23 of the housing 22. Alternatively, if desired, the heat transfer equipment can be employed to supply a hot medium, such as hot water or steam, to the housing 22 to heat the forming material processed within the housing.

A pair of extrusion screws comprising a first extrusion screw 38 and a second extrusion screw 40 are rotatably mounted in the housing 22. Although two extrusion screws are illustrated, further examples can include a single extrusion screw or three or more extrusion screws. In the illustrated example, the first extrusion screw 38 is rotatably mounted within chamber 24, while the second extrusion screw 40 is rotatably mounted within chamber 26. The first extrusion screw 38 and the second extrusion screw 40 can be arranged generally parallel to each other, as shown in FIG. 1, although they can also be arranged at various angles relative to one other. Each of the first extrusion screw 38 and the second extrusion screw 40 can be coupled to a first driving mechanism 42 and a second driving mechanism 43, respectively, as shown in FIG. 1 or they can be coupled to a common driving mechanism. Additionally, the driving mechanism for each extrusion screw can be arranged to rotate the extrusion screws in the same direction or in opposite directions.

Each of the first extrusion screw 38 and the second extrusion screw 40 can comprise a monolithic structure with different sections of the extrusion screw being designed differently so as to impart different processing influences on the forming material. In further examples, each extrusion screw can be made up of a plurality of extrusion elements, comprising segments of each extrusion screw, that are arranged in series substantially end-to-end along the longitudinal extent of the extrusion screw. The extrusion elements can be constructed and fashioned so as to impart various processing influences on the forming material processed within the housing 22 as the forming material is transported from the upstream end 28 of the housing 22 to the downstream end 30 of the housing 22. Alternatively, one or the other or both of the extrusion screws can be formed from a combination of separable extrusion elements and integral extrusion screw sections.

In one example, the first extrusion screw 38 can include a first drive shaft 46, driven by the first driving mechanism 42, and the second extrusion screw 40 can include a second drive shaft 48, driven by the second driving mechanism 43. The first drive shaft 46 can have a rotational axis generally aligned with the center of the chamber 24, and the second drive shaft 48 can have a rotational axis generally aligned with the center of the chamber 26. The first extrusion screw 38 and the second extrusion screw 40 can be removably coupled to the first drive shaft 46 and the second drive shaft 48, respectively, in a variety of ways. For example, the extrusion screws can be removably coupled to the drive shafts by means of spline arrangements, keyway structures and/or set screws. At the same time, the extrusion screws can be more or less permanently coupled to the first drive shaft 46 and the second drive shaft 48, such as by the application of adhesives and/or welding procedures for example.

As noted, the extrusion screws can be designed so that different sections of the extrusion screws impart different processing influences on the forming material processed at the extrusion apparatus 20. For example, in the embodiment of FIG. 1, a first pumping extrusion element 44, which can comprise a first extension screw segment, can be located on and secured to the first drive shaft 46, and a second pumping extrusion element 45, which can comprise a second extrusion screw segment, can be located on and secured to the second drive shaft 48. The first pumping extrusion element 44 and the second pumping extrusion element 45 can be located generally towards the upstream end 28 of the housing 22 primarily for the purpose of transporting the forming material from the material supply port 32 towards the downstream end 30 of the housing by pumping or pushing the forming material forward. The first pumping extrusion element 44 and the second pumping extrusion element 45 can include various single-flight or multi-flight spiral designs, as desired. The pumping extrusion elements can be of the meshing type having flights arranged so as to mesh with each other within the housing 22. In addition to the pumping extrusion elements, the drive shafts can carry additional extrusion elements, such as at locations 50 and 52, that can perform other processing operations on the forming material contained within the housing 22 as described in greater detail below. As shown, flights can extend in opposite directions wherein the first and second pumping extrusion elements 44, 45 are rotated in opposite rotational directions to pump the forming material forward in a direction toward the extrusion die 34. In other examples, the flights can extend in the same direction wherein the first and second pumping extrusion elements are rotated in the same rotational direction to pump the forming material forward in a direction toward the extrusion die 34.

From the foregoing description, it will be understood that the first extrusion screw 38 includes an axis of rotation that is coincident with the axis of rotation of the first drive shaft 46. Similarly, the second extrusion screw 40 includes an axis of rotation that is coincident with the axis of rotation of the second drive shaft 48. It will also be understood from the foregoing description that the interior surface 23 of the housing 22, which encloses the first extrusion screw 38 and the second extrusion screw 40, delimits an outward movement of the forming material outside the confines of the housing 22 as the forming material is processed and transported by the first extrusion screw 38 and the second extrusion screw 40 through the extrusion apparatus 20 to the extrusion die 34.

The forming material processed by the extrusion apparatus 20, such as the cordierite batch material for example, can react negatively to shear gradients, temperature gradients and compositional constituent gradients that can result from the processing of the forming material within the housing 22 of the extrusion apparatus 20, particularly as that processing involves the mixing of the forming material. Such gradients can result in differential flows in the ceramic batch material, causing various internal defects in extrusions formed at the extrusion die 34. For example, undesirable patterns and/or defects can be created in the cell walls of honeycomb extrusions formed at the extrusion die 34 as a result of undesirable patterns in rheology created in the slug of ceramic batch material that feeds the extrusion die 34 from the discharge port 36. Such patterns can be caused by shear gradients resulting from the mixing and/or pumping of the ceramic batch material by the first extrusion screw 38 and the second extrusion screw 40 of the extrusion apparatus 20. The patterns can also be caused by temperature gradients resulting from the mixing and/or the pumping of the ceramic batch material by the first and second extrusion screws and/or the cooling system associated with the housing 22 by the heat transfer equipment (not shown) situated in a heat-transfer relationship with the shell of the housing 22. For example, if the ceramic batch material is not thoroughly mixed, the batch material may include a relatively hot center and a relatively cool outer portion due to the cooling effect provided at the interior surface 23 of the housing 22. As such, without thorough mixing, undesirable temperature gradients may be established in the ceramic batch material that can reduce the quality of the honeycomb structures extruded by the extrusion apparatus.

It can be beneficial to provide at the first extrusion screw 38 and the second extrusion screw 40, such as at the locations 50 and 52, respectively, extrusion elements comprising mixing segments 54 that are configured to produce a relatively uniform mixture of forming material having reduced temperature, shear, and/or compositional constituent gradients at the extrusion die 34. As shown in FIG. 1, the mixing segments 54 can be provided at both the first extrusion screw 38, at location 50, and the second extrusion screw 40, at location 52, with the locations 50 and 52 being situated towards the downstream side 30 of the housing 22 near the discharge port 36.

As apparent in FIG. 1, the extrusion apparatus 20 can therefore include one or more mixing segments 54 extending within an interior area (e.g., chambers 24, 26) defined by the housing 22. As shown, in one example, the mixing segment 54 includes a first mixing segment 54a and a second mixing segment 54b extending within the interior area, wherein the rotation axis of the shafts of the mixing segments are spaced apart from one another. In one example, as shown in FIG. 1, the rotation axis 56a of the first mixing segment 54a is substantially parallel with respect to the rotation axis 56b of the second mixing segment 54b.

In further examples, the mixing segments 54 can be provided at only one of the first extrusion screw 38 and the second extrusion screw 40 and the mixing segments 54 can be located at various sites along the extrusion screws. For example, the mixing segments can be located along a greater length of one or both of the first extrusion screw 38 and the second extrusion screw 40 than shown in FIG. 1 and can be located so as to be spaced from the discharge port 36. In fact, mixing segments 54 configured to produce a relatively more uniformly mixed forming material having reduced temperature, shear, and/or compositional constituent gradients can comprise the entirety of one or both of the first extrusion screw 38 and the second extrusion screw 40 for example. Additionally, the mixing segments 54 can be provided at locations that are spaced apart along one or both of the first extrusion screw 38 and the second extrusion screw 40.

FIGS. 2-13 illustrate some example mixing segments that can function to minimize the energy input required to promote a relatively more uniform dispersive and distributive mixing of the forming material in the housing 22 while at the same time reducing the tendency for temperature, shear and/or compositional constituent gradients to be formed. The mixing segments shown in FIGS. 2-13 can be applied not only to a twin-screw extrusion apparatus (e.g., see FIG. 1), but the mixing segments can be employed at a screw apparatus that employs a single extrusion screw, or three or more extrusion screws for example.

Figure 2:
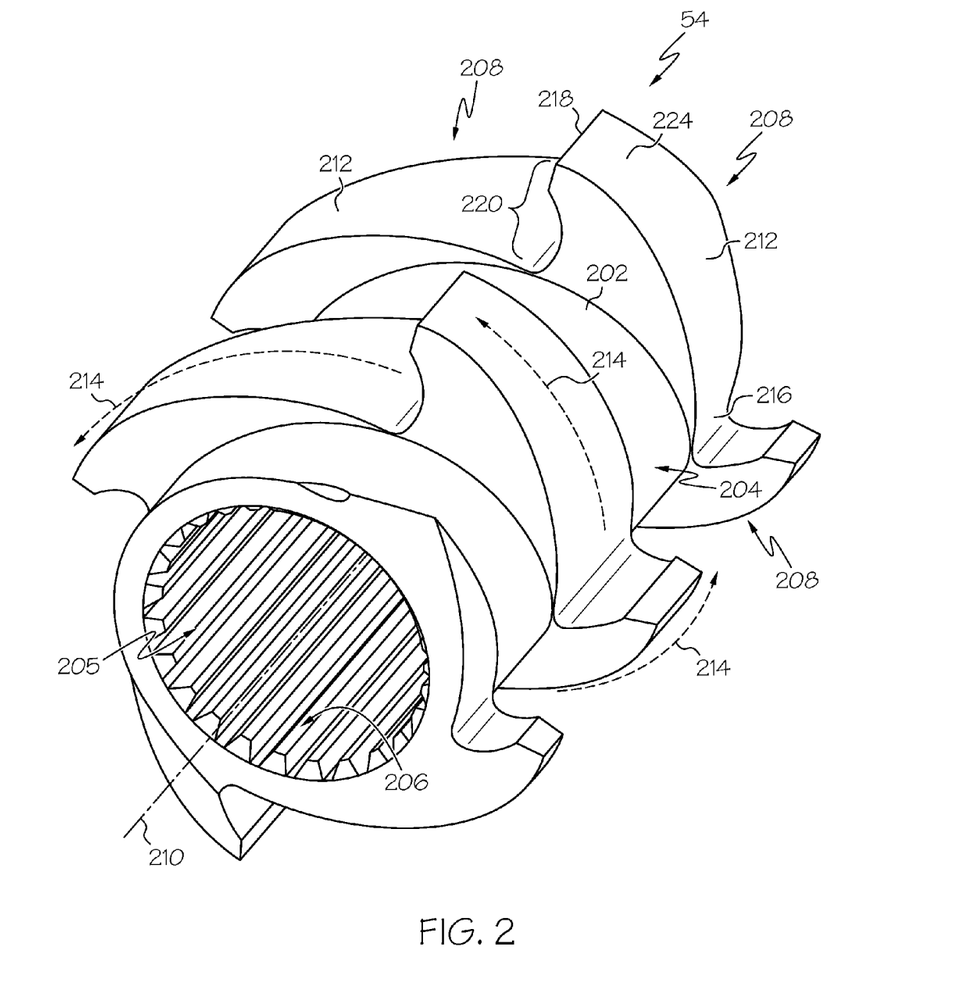
FIG. 2 is a perspective view of an example mixing segment of FIG. 1.

FIG. 2 illustrates some example features of the mixing segment 54 schematically illustrated in FIG. 1 that can minimize the energy input required to promote a relatively more uniform dispersive and distributive mixing of the forming material at the extrusion apparatus 20 while at the same time reducing any resulting temperature, shear and/or compositional constituent gradients.

As illustrated, the mixing segment 54 can include a shaft 202 and a plurality of plow elements 208. The shaft can comprise a cylindrical shaft with an outer circular cross-sectional profile to provide the outer surface 204 that comprises a substantially circular-cylindrical surface although other surface shapes may be provided in further examples. The shaft 202 can comprise a single integral shaft extending along the mixing segment 54 although the shaft may be divided in a plurality of segments that may be attached together. In further examples, the shaft 202 can comprise a solid shaft although hollow shafts may be provided in further examples. For instance, as shown, the shaft 202 comprises a hollow shaft having a through passage 205 with an interior key surface 206 comprising a splined surface that may mate with a corresponding splined surface of a keyed drive shaft that may be inserted within the through passage 205.

The mixing segment 54 further includes a plurality of plow elements 208 aligned along a helical path 302 (see FIG. 3) extending about a rotation axis 210 of the shaft 202. As shown, the plow elements 208 are integral with the shaft 202 although the plow elements may be separate and attached to the shaft 202 in further examples.

Figure 7:
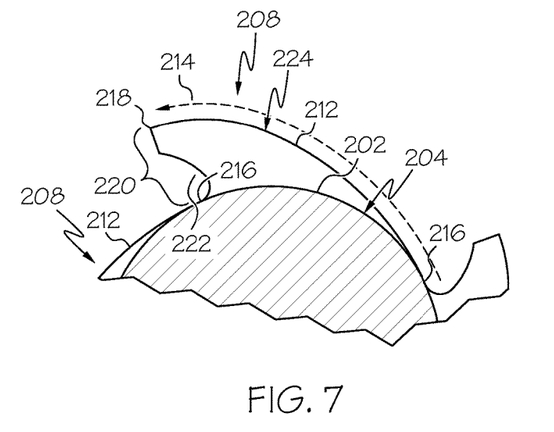
FIG. 7 is a partial cross section of the mixing segment along line 7-7 of FIG. 3.

Each plow element 208 includes an outer peripheral arcuate ramp 212 extending radially outwardly (e.g., along direction 214) along the helical path 302 from a root 216 to an outer tip 218 of the plow element 208. The arcuate ramp 212 can be dimensioned such that the outer tip 218 is positioned closely adjacent the inside surface 23 of the housing 22 of the extrusion apparatus 20 in operation. As shown in FIG. 7 each plow element 208 can further include a step 220 extending radially inward from the outer tip 218 of the plow element 208 toward the shaft 202. The step 220 can include a portion 222 extending underneath the respective outer tip 218 of the plow element 208. As further shown in FIGS. 2 and 7, each step 220 can be positioned between a corresponding pair of the arcuate ramps 212 of the plow elements 208.

As shown in FIG. 2, the plow elements 208 can be substantially identical to one another although the plow elements may be different in further examples. Moreover, as shown, the plow elements 208 are substantially equally radially spaced with respect to one another about the rotation axis 210 of the shaft 202 although the plow elements may be unequally spaced with respect to one another in further examples.

Figure 8:
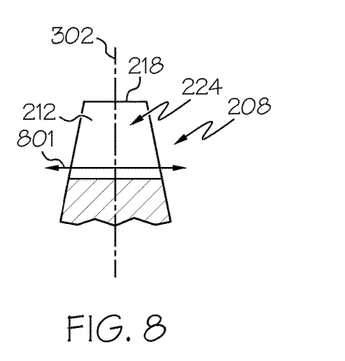
FIG. 8 is a partial cross section of a plow element of the mixing segment along line 8-8 of FIG. 3.

The arcuate ramps of the present disclosure can include a wide range of ramp features. For example, as shown in FIGS. 2, 7 and 8, each ramp 212 can comprise an unenclosed conveying surface 224. Indeed, as particularly apparent in FIGS. 7 and 8, each arcuate ramp does not have any surface features that would act to inhibit retention of forming material from falling off the conveying surface 224 of the ramp 212. Rather, as apparent in FIGS. 7 and 8, each arcuate ramp 212 can include a substantially straight profile along a direction 801 transverse to the helical path 302.

Each arcuate ramp of various examples of the present disclosure can include a convex helical profile along the helical path. For example, as shown in FIG. 7, the conveying surface 224 of the arcuate ramp 212 can comprise a convex helical profile extending along the direction 214 along the helical path 302.

Figure 9:
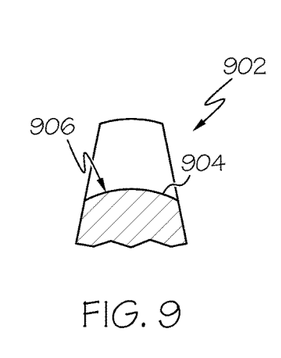
FIG. 9 is a partial cross section of another plow element.

FIG. 9 illustrates another example plow element 902 with a ramp 904 having an unenclosed conveying surface 906. Like the conveying surface 224 of ramp 212 of the plow element 208 illustrated in FIGS. 2, 7 and 8, each arcuate ramp 904 also does not have any surface features that would act to inhibit retention of forming material from falling off the conveying surface 906 of the ramp 904. Rather, as apparent in FIG. 9, each arcuate ramp 904 can include a substantially convex profile along the direction transverse to the helical path 302.

Figure 10:
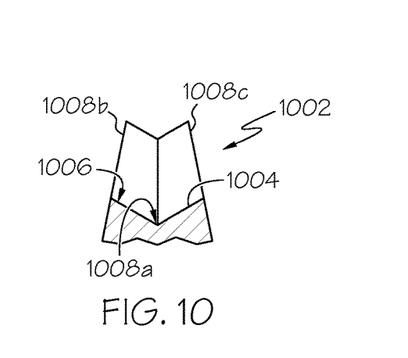
FIG. 10 is a partial cross section of yet another plow element.

In further examples, plow elements may include a ramp with a conveying surface that is at least partially enclosed. In such examples, the ramp includes at least one surface feature that would act to at least partially inhibit forming material from falling off the conveying surface of the ramp. For example, FIG. 10 illustrates another example plow element 1002 with a ramp 1004 having a conveying surface 1006 that is at least partially enclosed. Indeed, as shown, the arcuate ramp 1004 includes a conveying surface 1006 with a substantially V-shaped profile along the direction transverse to the helical path 302. The upper inclined surfaces of the V-shape profile extending from a lower central portion 1008a to lateral upper edge portions 1008b, 1008c can act to at least partially inhibit forming material from falling off the conveying surface 1006 of the ramp 1004. Indeed, the V-shaped profile may facilitate retention of portions of the forming material as it is conveyed along direction 214 as shown in FIG. 7.

Figure 11:
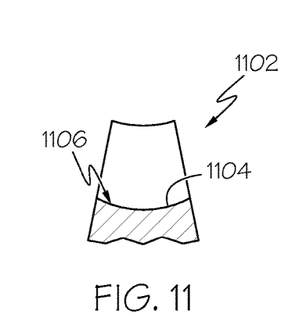
FIG. 11 is a partial cross section of still another plow element.

FIG. 11 illustrates another example plow element 1102 with a ramp 1104 having a conveying surface 1106 that is at least partially enclosed. Indeed, as shown, the arcuate ramp 1104 includes a conveying surface 1106 with a substantially concave profile along a direction transverse to the helical path 302. The substantially concave profile can act to at least partially inhibit forming material from falling off the conveying surface 1106 of the ramp 1104. Indeed, the substantially concave profile may facilitate retention of portions of the forming material as it is conveyed along direction 214 as shown in FIG. 7.

Figure 12:
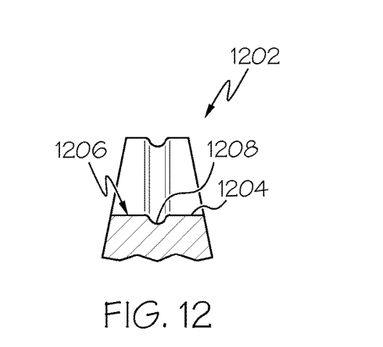
FIG. 12 is a partial cross section of a further plow element.

FIG. 12 illustrates another example plow element 1202 with a ramp 1204 having a conveying surface 1206 that is at least partially enclosed. Indeed, as shown, the arcuate ramp 1204 includes a conveying surface 1206 with a groove 1208 extending along the helical path 302. The groove 1208 can act to at least partially inhibit forming material from falling off the conveying surface 1206 of the ramp 1204. Indeed, the groove 1208 may facilitate retention of portions of the forming material as it is conveyed along direction 214 as shown in FIG. 7.

Figure 3:
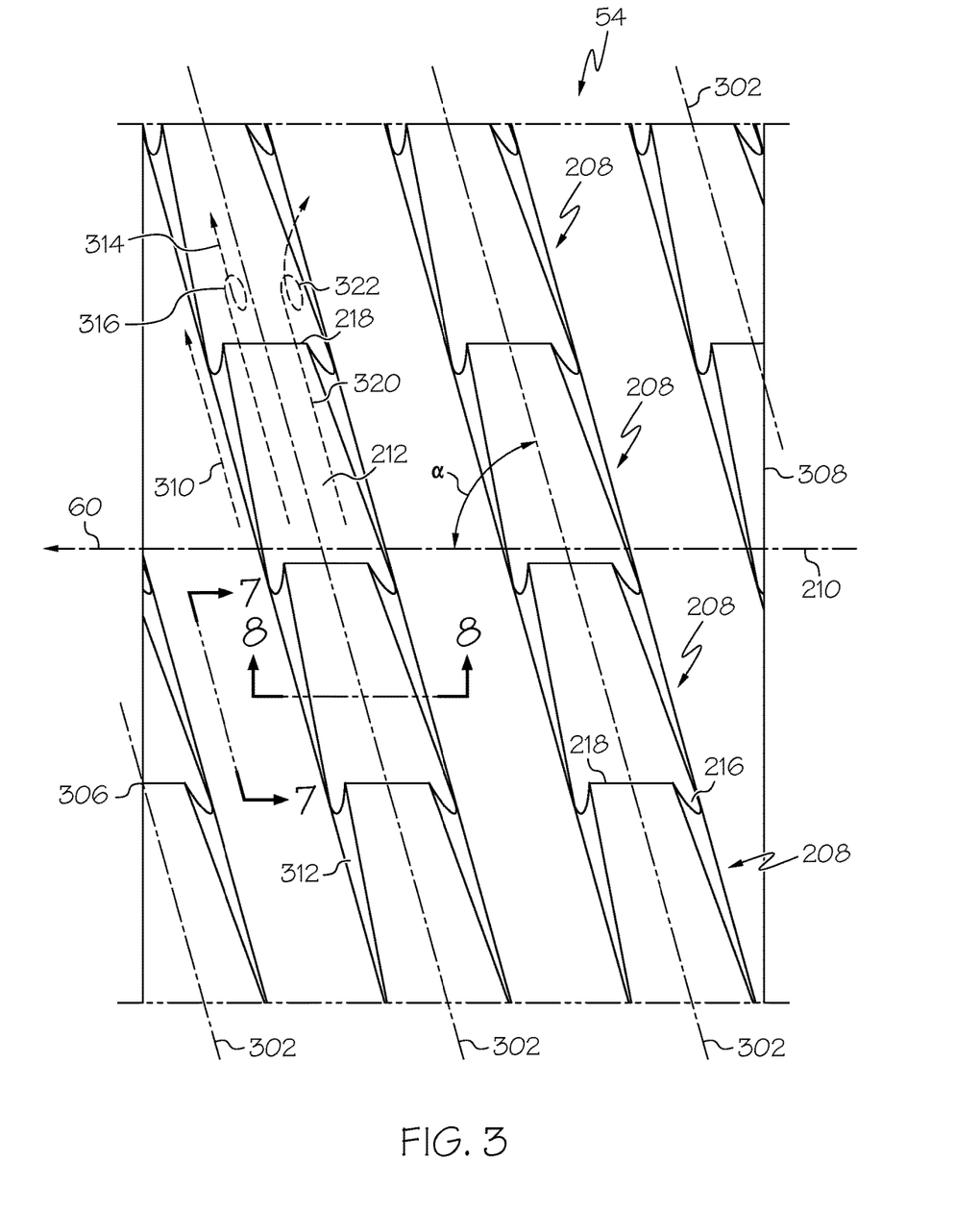
FIG. 3 is an unfolded view of the mixing segment of FIG. 2 at which plow elements are arranged according to one configuration.

In one example, the plow elements 208 can be arranged along a single or a multiple flights. FIG. 3 illustrates an unfolded view of the mixing segment 54 in accordance with one example. As shown, the plow elements can be arranged along a single helical flight that winds approximately three times about the rotation axis 210 of the shaft 202. A trailing end 308 of the flight is configured to cooperate with a leading end 306 of an adjacent mixing segment 54 to provide a substantially continuous effective flight along the coaxially aligned mixing segments 54. As shown, the plow elements 208 can each be aligned along the helical path 302. As such, the outer tip 218 of one plow element can extend over the root 216 of the next plow element along the helical path 302.

Figure 13:
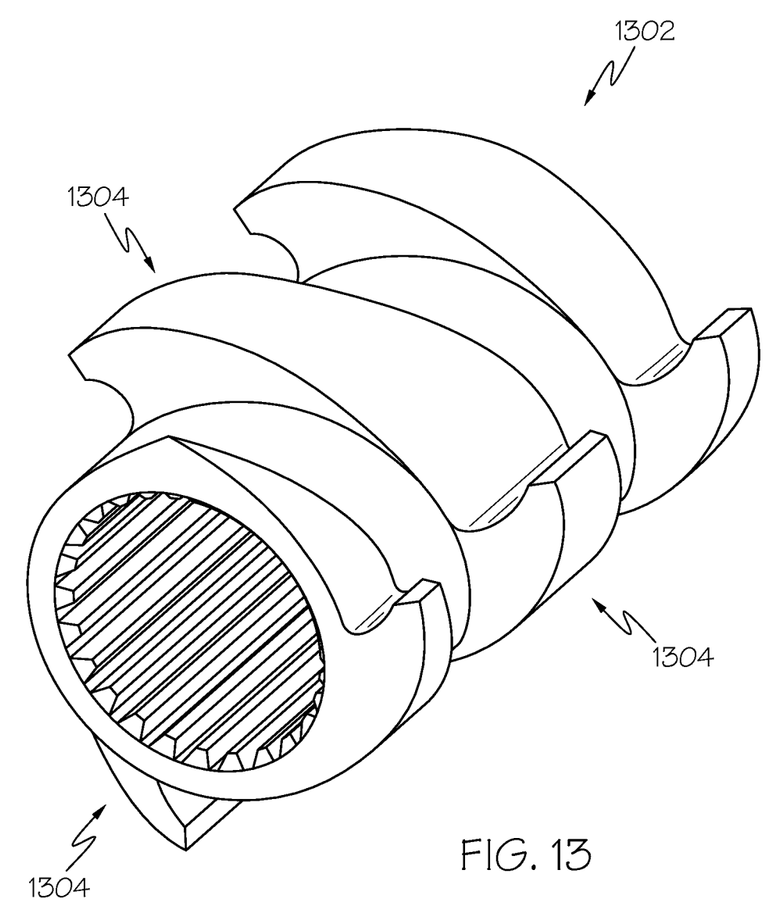
FIG. 13 is a perspective view of another example mixing segment of FIG. 1.

As apparent in FIG. 3, each 360° winding of the helical flight can include four plow elements 208 although a single plow element or two, three or more than four plow elements may be provided in further examples. For instance, FIG. 13 illustrates another example mixing segment 1302 similar or identical to the mixing segment 54 but including three plow elements 1304 for each 360° winding of the helical flight.

Figure 4:
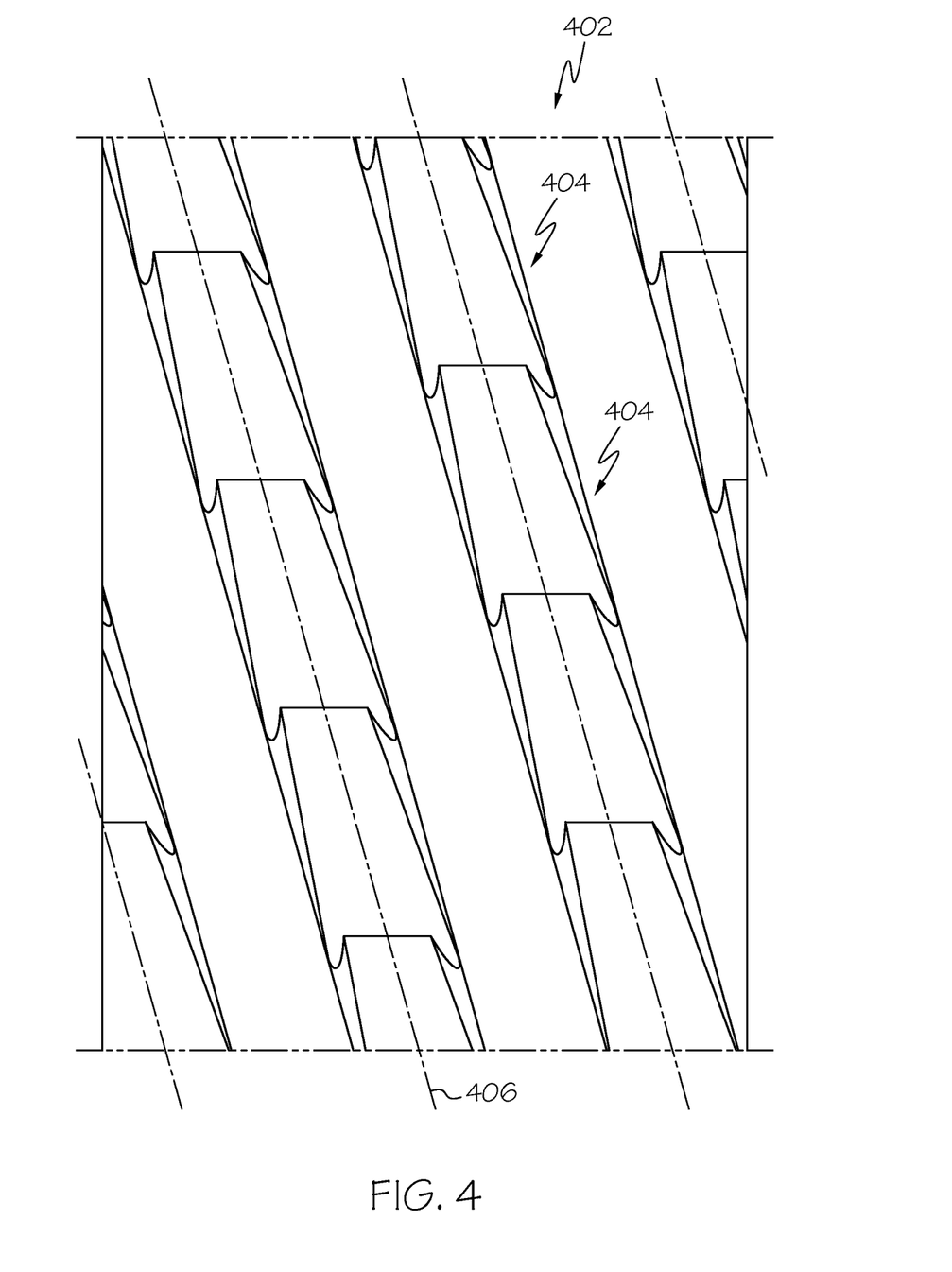
FIG. 4 is another example unfolded view of another mixing segment at which the plow elements are arranged according to another configuration.

As can be seen in FIGS. 2 and 3, the plow elements 208 can be axially arranged in a pattern where each plow element 208 (or partial plow element) of each winding of the helical flight is axially aligned with another plow element 208 (or partial plow element) in an adjacent winding of the helical flight. In further examples, the plow elements may be arranged out of axial alignment. For example, FIG. 4 illustrates another unfolded view of another mixing segment 402 that may have similar or identical features with the mixing segment 54 with a plurality of plow elements 404 similar or identical to the plow elements 208. As shown, the plow element 404 are axially arranged in an alternative pattern where each plow element 404 (or partial plow element) of each winding of a helical flight 406 is axially misaligned with all of the plow elements 404 (or partial plow elements) in an adjacent winding of the helical flight. As further shown in FIG. 4, in one example, one or more plow elements 404 (or partial plow element) of each winding of a helical flight 406 is axially aligned with another plow element of a nonadjacent winding. As such, as suggested by FIG. 4, every other winding may include plow elements that are axially aligned with one another, as contrasted with FIG. 3, where every winding includes plow elements that are axially aligned with one another. Although not shown, the plow elements may be arranged in other patterns, such as a random arrangement of plow elements or a nonrepeating pattern of plow elements.

Figure 5:
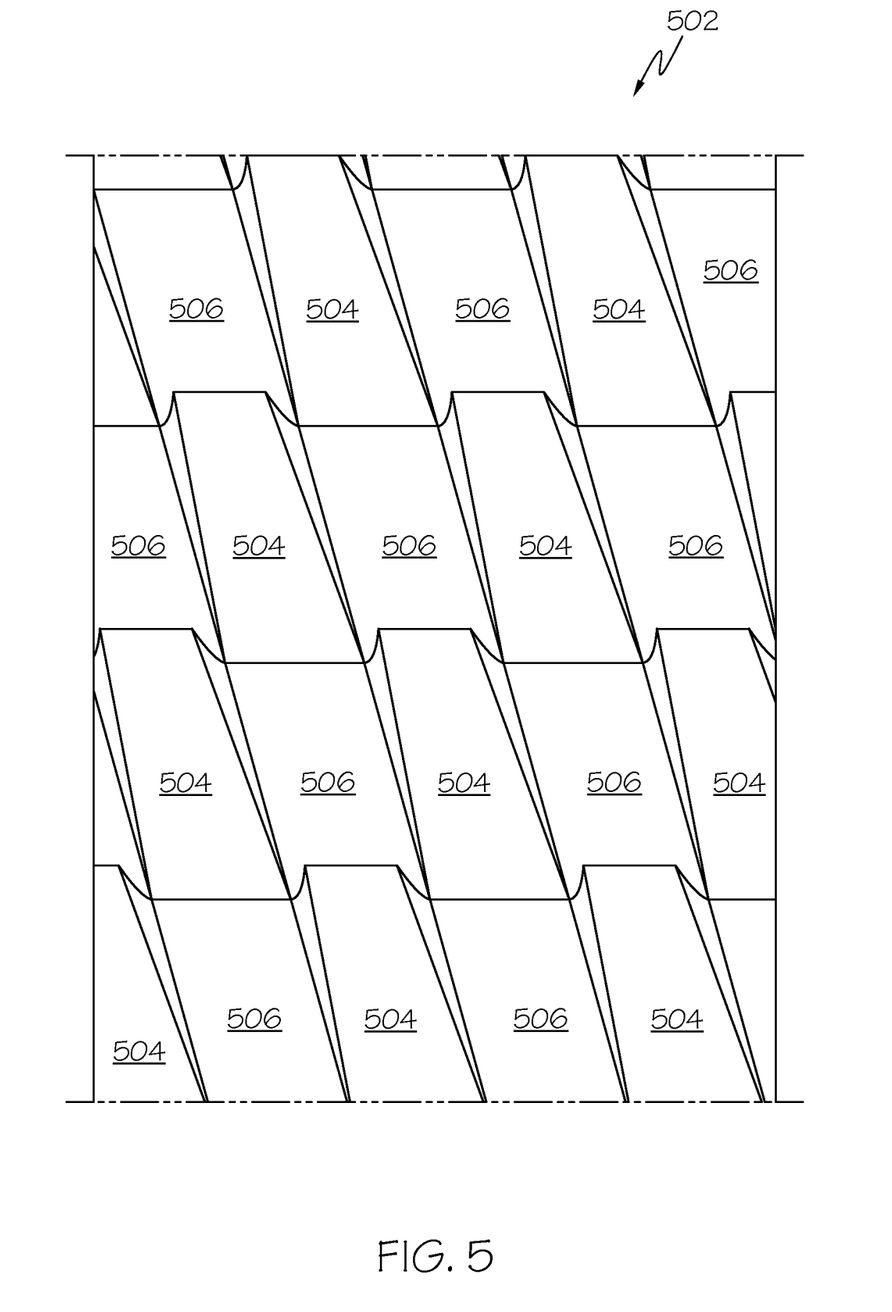
FIG. 5 is another example unfolded view of another mixing segment at which the plow elements are arranged according to still another configuration.

FIG. 5 illustrates another unfolded view of another mixing segment 502 that may have similar or identical features with the mixing segment 54 with a plurality of plow elements 504 that may be similar or identical to plow elements 208. However, as shown, the plow elements may be staggered relative to one another and axially spaced apart along rows by segments 506 of the outer surface of the shaft of the mixing segment 502. The staggered arrangement of plow elements 504 can provide enhanced mixing when compared to the aligned plow elements of FIGS. 3 and 4. However, FIGS. 3 and 4 may be easier to manufacture than the staggered arrangement of FIG. 5.

Figure 6:
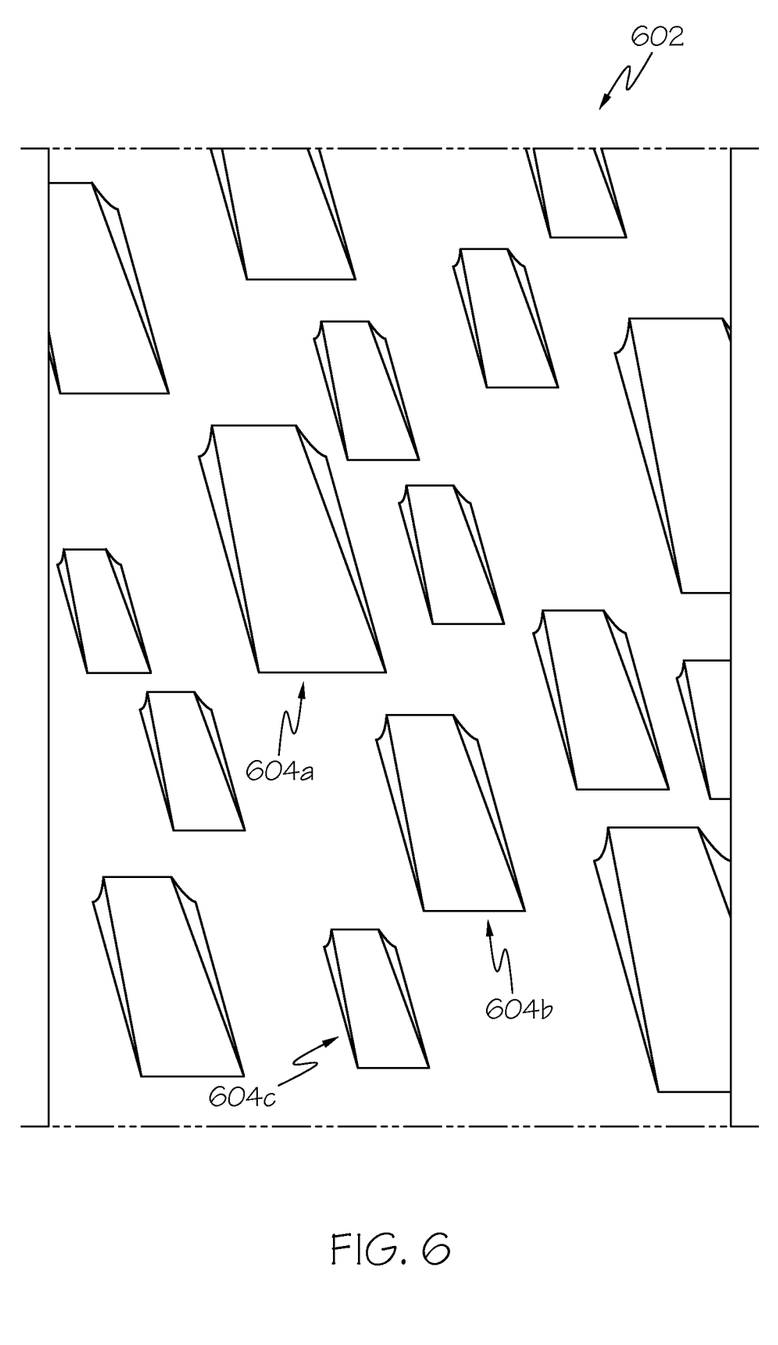
FIG. 6 is another example unfolded view of another mixing segment at which the plow elements are arranged according to yet another configuration.

FIG. 6 illustrates another unfolded view of another mixing segment 602 that may have similar or identical features with the mixing segment 54 with a plurality of plow elements 604a-c that may be similar or identical to plow elements 208. However, as shown, the plow elements 604a-c may optionally be randomly placed relative to one another along the outer surface of the shaft of the mixing segment 602. In addition or alternatively, the plow elements may optionally have different shapes from one another. For illustration purposes, the plow elements include a plurality of large plow elements 604a, medium sized plow elements 604b and small sized plow elements 604c although any number of different sizes may be provided in various examples. Providing random placement and/or different sized plow elements may provide enhanced mixing when compared to the aligned plow elements of a single size illustrated in FIGS. 3 and 4. However, FIGS. 3 and 4 may be easier to manufacture than the random placement and/or different sized plow elements shown in FIG. 6.

As shown in FIG. 3, the helical path 302 may be arranged at an angle α with respect to the rotation axis 210 of the shaft 202. The appropriate angle α can be determined based on the velocity ($V_1$), a vector value, at which the forming material advances past the at least one mixing segment, respectively, and the arithmetic average ($V_2$) of the tangential velocity, a vector value, at the outer surface 204 of the shaft 202 of the mixing segment, respectively, and the tangential velocity, a vector value, at the outer tip 218 of the ramp 212, respectively. Proceeding with the assumption that $V_1$ and $V_2$ are at ninety degrees with respect to one another, the angle α, of the helical path 302 with respect to the rotation axis 210 of the shaft 202 can be determined from the following formula:

$$\alpha = \sin^{-1} \frac{V_2}{\sqrt[2]{(V_1)^2 + (V_2)^2}}$$

A method of manufacturing the mixing segment discussed herein can include the step of determining a velocity vector for a desired velocity of the passage of the forming material through the extrusion apparatus 20. The method can further include the step of determining a velocity vector for the tangential velocity at the outer surface 204 of the shaft 202 at a desired rotational speed of the shaft 202. The method can still further include the step of determining a velocity vector for the tangential velocity at the outer tip 218 of the plow element 208 for the desired rotational speed of the shaft 202. The method further includes the step of calculating the arithmetic average of the velocity vector for the tangential velocity at the outer surface 204 of the shaft 202 and the velocity vector for the tangential velocity at the outer tip 218 of the plow element 208. The method can still further include the step of calculating a resultant velocity vector based on the velocity vector for a desired velocity of the passage of the forming material through the extrusion apparatus 20 and the arithmetic average of the velocity vector. The method can then include the step of manufacturing the mixing segment such that the helical path is positioned at an angle α with respect to the rotation axis 210 of the shaft 202 based on the calculated resultant velocity vector.

Figure 14:
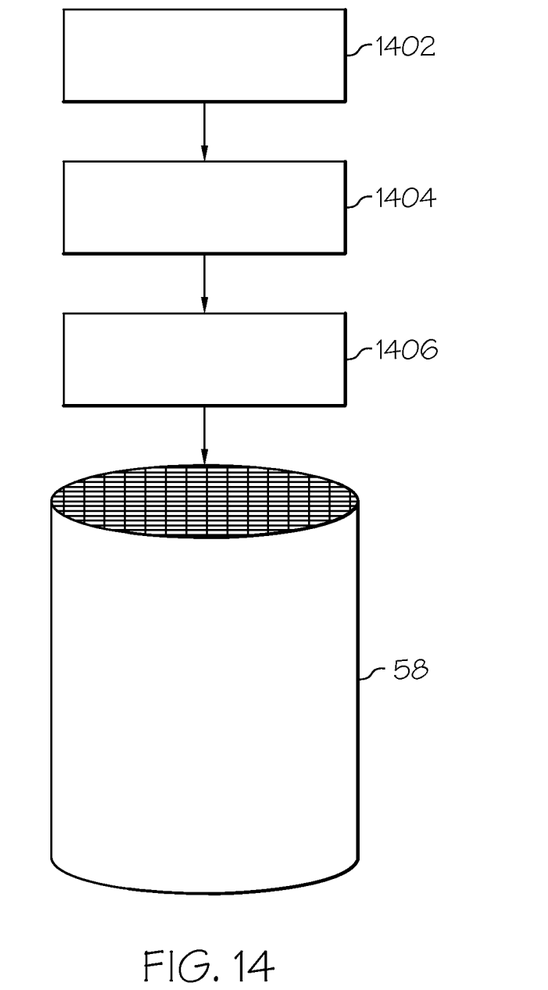
FIG. 14 is a flow chart illustrating methods of manufacturing a honeycomb structure.

Methods of manufacturing a honeycomb structure 58 (see FIG. 1) will now be described. The method can employ the extrusion apparatus 20 including the housing 22 defining the interior area and the mixing segment, such as any of the mixing segments set forth in the present disclosure. The mixing segment extends within the interior area. As discussed with reference to FIG. 2, for example, the mixing segment 54 can include the shaft 202 and the plurality of, plow elements 208 aligned along the helical path 302 extending about the rotation axis 210 of the shaft 202. As discussed previously, each plow element 208 can include the outer peripheral arcuate ramp 212 extending radially outwardly along the helical path 302 from the root 216 to the outer tip 218 of the plow element 208. Referring to FIG. 14, the method includes the step 1402 of introducing a quantity of ceramic or ceramic forming material into the interior area of the housing 22.

The method can further include the step 1404 of rotating the mixing segment 54 about the rotation axis 210 of the shaft 202 such that first portions of the quantity of forming material are urged in an extrusion direction 60 (see FIGS. 1 and 3). As shown in FIG. 3, the first portions 310 of the forming material can travel along lateral sides 312 of the plow elements 208 as the mixing segment 54 rotates about the rotation axis 210 to travel in the extrusion direction 60. Further, second portions 314 of the quantity of the forming material travel along at least a respective portion of the outer peripheral arcuate ramp 212 and plowed over the outer tip 218 of the respective plow element 208. As indicated by loop portion 316 as the second portions 314 pass over the outer tip 218, the second portions 314 may be plowed over such that the second portions of the forming material are folded over itself thereby allowing outer radial areas of the second portions 314 to flip positions with inner radial areas of the second portions 314. Still further, as indicated, third portions 320 may actually fall off a trailing edge of the ramp 212 and optionally plowed under as indicated by loop 322. The third portions 320 can then be similarly picked up by the trailing 360° winding of the plow elements 208.

Therefore, as discussed above, as the mixing segment 54 rotates, first portions 310 of the forming material are urged to travel along the extrusion direction 60 by lateral sides 312 of the plow elements 208. At the same time, the conveying surface 224 of the ramp 212 radially conveys second portions 314 of the forming material away from the root 216 to the outer tip 218 of the plow element 208. As such, the conveying surface 224 results in radially lifting second portions 314 of the forming material from the root 216 to the outer tip 218 as the second portions 314 travel along the conveying surface 224. Once lifted, the forming material can be folded over the outer tip 218 as discussed above.

Moreover, as discussed above, the step 220 can include a portion 222 extending underneath the respective outer tip 218 of the plow element 208. In one example, step 1404 plows the second portions 314 of the quantity of forming material over the outer tip 218 of the respective plow element 208 into a corresponding step 220 (see FIGS. 2 and 7) positioned between the respective plow element and an adjacent plow element along the helical path 302 of the mixing segment 54. In further examples, the method can include the step of plowing part of the second portion 314 of the quantity of forming material into the portion 222 of the corresponding step 220 extending underneath the outer tip 218 of the respective plow element 208. The undercut portion 222 can provide clearance to facilitate plowing to allow more successful folding of the forming material over itself. As such, the mixing segments of the disclosure can be helpful to facilitate mixing and conveying of forming material to allow more uniform mixture of forming material prior to extrusion.

As illustrated in FIG. 14, the method can also include the step 1406 of extruding the forming material through the extrusion die 34 (see FIG. 1) to form the honeycomb structure 58. Further processing steps (e.g., drying, sintering) can thereafter be carried out to form the honeycomb structure 58 into a ceramic honeycomb structure. For example, the ceramic honeycomb structure can optionally comprise a porous ceramic honeycomb structure. In one example the ceramic honeycomb structure (e.g., porous ceramic honeycomb structure) may be used to carry a catalyst coating to help process gas of an exhaust stream. In addition or alternatively, a porous ceramic honeycomb structure may be used as a pass through particulate filter, for example, to filter particulate from a diesel exhaust stream.

It will be apparent to those skilled in the art that various modifications and variations can be made without departing from the spirit and scope of the claims set forth below.

What is claimed is:

1. A mixing segment for an extrusion apparatus comprising:
   a shaft; and
   a plurality of plow elements aligned along a helical path extending about a rotation axis of the shaft, wherein each plow element includes an outer peripheral arcuate ramp extending from the shaft radially outwardly along the helical path from a root to an outer tip of the plow element, wherein the arcuate ramp includes a convex helical profile along the helical path, wherein each plow element further includes a step extending radially inward from the outer tip of the plow element toward the shaft, and wherein the step includes a portion extending underneath the respective outer tip of the plow element and wherein the outer tip of one plow element extends over the root of another plow element along the helical path.

2. The mixing segment of claim 1, wherein each step is positioned between a corresponding pair of the arcuate ramps of the plow elements.

3. The mixing segment of claim 1, wherein the plurality of plow elements are substantially identical to one another.

4. The mixing segment of claim 1, wherein the plow elements are substantially equally radially spaced with respect to one another about the rotation axis of the shaft.

5. The mixing segment of claim 1, wherein each ramp comprises an unenclosed conveying surface.

6. The mixing segment of claim 1, wherein the arcuate ramp includes a substantially convex transverse profile along a direction transverse to the helical path.

7. The mixing segment of claim 1, wherein the arcuate ramp includes a substantially straight transverse profile along a direction transverse to the helical path.

8. The mixing segment of claim 1, wherein the arcuate ramp includes a substantially concave transverse profile along a direction transverse to the helical path.

9. The mixing segment of claim 1, wherein the arcuate ramp includes a substantially V-shaped transverse profile along a direction transverse to the helical path.

10. The mixing segment of claim 1, wherein the arcuate ramp includes a groove extending along the helical path.

11. An extrusion apparatus including the mixing segment of claim 1, the extrusion apparatus comprising:
    a housing defining an interior area, wherein the mixing segment extends within the interior area.

12. The extrusion apparatus of claim 11, wherein the mixing segment includes a first mixing segment and a second mixing segment extending within the interior area, wherein the rotation axis of the shafts of the mixing segments are spaced apart from one another.

13. The extrusion apparatus of claim 12 wherein the rotation axis of the first mixing segment is substantially parallel with respect to the rotation axis of the second mixing segment.

14. A mixing segment for an extrusion apparatus comprising:
    a shaft; and
    a plurality of plow elements aligned along a helical path extending about a rotation axis of the shaft, wherein each plow element includes an outer peripheral arcuate ramp extending from the shaft radially outwardly along the helical path from a root to an outer tip of the plow element, wherein each plow element further includes a step extending radially inward from the outer tip of the plow element toward the shaft, wherein the step includes a portion extending underneath the respective outer tip of the plow element, and wherein the outer tip of one plow element extends over the root of another plow element along the helical path wherein the arcuate ramp includes a convex helical profile along the helical path.

15. A mixing segment for an extrusion apparatus comprising:
    a shaft; and
    a plurality of plow elements aligned along a helical path extending about a rotation axis of the shaft, wherein each plow element includes an outer peripheral arcuate ramp extending from the shaft radially outwardly along the helical path from a root to an outer tip of the plow element, wherein each plow element further includes a step including a first portion extending radially inward from the outer tip of the plow element toward the shaft and a second portion extending underneath the respective outer tip of the plow element and underneath the respective first portion of the step and wherein the outer tip of one plow element extends over the root of another plow element along the helical path.

16. The mixing segment of claim 15, wherein the arcuate ramp includes a convex helical profile along the helical path.

17. The mixing segment of claim 15, wherein the outer tip and the first portion of the step of one plow element extends over the root of another plow element along the helical path.

* * * * *